United States Patent
Kubo et al.

(10) Patent No.: US 6,480,286 B1
(45) Date of Patent: Nov. 12, 2002

(54) METHOD AND APPARATUS FOR MEASURING THICKNESS VARIATION OF A THIN SHEET MATERIAL, AND PROBE REFLECTOR USED IN THE APPARATUS

(75) Inventors: Keishi Kubo, Moriguchi (JP); Keiichi Yoshizumi, Higashiosaka (JP); Yukio Imada, Hirakata (JP); Hiroyuki Takeuchi, Hirakata (JP); Koji Handa, Osaka (JP)

(73) Assignee: Matsushita Electric Inudstrial Co., Ltd., Osaka (JP)

( * ) Notice: Subject to any disclaimer, the term of this patent is extended or adjusted under 35 U.S.C. 154(b) by 0 days.

(21) Appl. No.: 09/533,652

(22) Filed: Mar. 22, 2000

(30) Foreign Application Priority Data

Mar. 31, 1999 (JP) .......................... 11-092609
Mar. 31, 1999 (JP) .......................... 11-092610

(51) Int. Cl.$^7$ ................................................. G01B 9/02
(52) U.S. Cl. ..................................................... 356/503
(58) Field of Search ............................. 356/485, 492, 356/503, 521, 501, 512

(56) References Cited

U.S. PATENT DOCUMENTS 5,969,273 A * 10/1999 Archie et al. ............... 356/503
5,995,226 A * 11/1999 Abe et al. ................... 356/503
6,100,977 A *  8/2000 Muller ........................ 356/496

FOREIGN PATENT DOCUMENTS

| JP | 1070162 A | | 3/1998 |
| JP | 02001033215 A | * | 2/2001 |
| WO | WO-97/27452 | * | 7/1997 |

* cited by examiner

Primary Examiner—Samuel A. Turner
(74) Attorney, Agent, or Firm—Jordan and Hamburg LLP (57) ABSTRACT

Optical displacement gauges 20 are respectively arranged on both sides of a thin sheet material w, and displacement of surface position of the thin sheet material w is measured by irradiating measurement light $L_1$ to the surface of the thin sheet material w. Thickness variation of the thin sheet material w is obtained from the measurement results of displacement of the surface position of the thin sheet material w.

11 Claims, 6 Drawing Sheets

METHOD AND APPARATUS FOR MEASURING THICKNESS VARIATION OF A THIN SHEET MATERIAL, AND PROBE REFLECTOR USED IN THE APPARATUS

BACKGROUND OF THE INVENTION

1. Technical Field of the Invention

The present invention relates to a method and apparatus for measuring thickness variation of a thin sheet material. More particularly, the present invention relates to measurement of thickness variation of wafers for use in semiconductor devices, which need to meet stringent requirements for little variation in thickness in a surface direction, and further relates to a probe reflector used in the thickness variation measuring apparatus.

2. Description of Related Art

Wafers used for semiconductor devices consist of a thin sheet material of silicone or the like. For fabrication of semiconductor elements and circuits on the surface of a wafer, photoetching techniques, printing techniques, and various micro machining techniques are applied.

In processing a wafer using these techniques, it is essential to achieve high planarity of the wafer surface. Deterioration in surface planarity may blur the patterns of semiconductor elements or circuits formed by photoetching, or make the contour of a material printed in patterns on the wafer surface unclear. With the increase in density and scale of semiconductor elements and circuits, the above problem becomes crucial.

In the fabrication of semiconductor devices, it is the normal practice to hold the entire surface of the wafer on a flat support surface by means of vacuum suction or the like during various processes. If the thickness of the wafer varies in different locations, the planarity of the wafer surface will in turn vary, as the backside of the wafer is held on a flat support surface in tight contact therewith. There is thus the requirement for minimization of variation in thickness of the wafer. Evaluation of wafer thickness variation in a wafer production process entails precise and efficient measurement of variation in wafer thickness.

Japanese Laid-open Patent Application No. 10-70162 discloses an apparatus for measuring thickness variation of a wafer. In this technique, a disk-shaped wafer is rotated as held vertically, and using a capacitance displacement sensor disposed opposite both faces on one side of the wafer, thickness variation of the wafer is calculated from the measured displacement of wafer surface with respect to the sensor. The capacitance displacement sensor is scanned in a radial direction of the wafer, thereby measuring the thickness variation of the entire surface of the wafer.

However, the above described apparatus has a limit to measurement precision, and is not suitable for highly precise thickness variation measurement required for the fabrication of semiconductor devices of high density in recent years.

The capacitance displacement sensor used in the above described apparatus measures displacement of wafer surface with respect to the sensor by electric measurement of capacitance between the wafer surface and the sensor. For that reason, the measurement results are highly dependent on electrical properties of the wafer which may change depending on the material of the wafer or ambient conditions. Such electrical properties may also vary in different locations on a same wafer. Measurement precision of wafer thickness variation by this capacitance sensor is thus apt to deteriorate. Further, precise measurement of capacitance at the peripheral edge of the wafer is practically impossible, and since the thickness variation in this part cannot be estimated, it is normally regarded that such peripheral portion of the wafer to a width of about 3 mm from the outermost edge of the wafer cannot be used for semiconductor devices. Wafer material is accordingly wasted. Moreover, in some cases depending on conductive properties of the wafer, measurement by the above capacitance displacement sensor is technically difficult. Also, as noted above, measurement results are greatly affected by ambient conditions between the sensor and the wafer.

In accordance with the increase in density of the semiconductor elements and circuits in recent years, it is the normal requirement that thickness variation measurement of a wafer should be carried out with the precision lower than 0.01 $\mu$m.

Theoretically, such high precision in thickness variation measurement can hardly be achieved with the above described capacitance displacement sensor, which is said to have the precision of about 0.05 $\mu$m.

Apart from wafers for semiconductor devices, there is a technical field where high precision is required in the measurement of thickness variation of a thin sheet material such as a substrate for magnetic disks.

SUMMARY OF THE INVENTION

In view of the foregoing, an object of the present invention is to provide a method and apparatus for measuring thickness variation of a thin sheet material such as a wafer highly accurately and efficiently.

In accordance with the present invention, using a pair of optical displacement gauges, measuring light is irradiated onto a surface of the thin sheet material, and displacement of surface position of the thin sheet material is measured by receiving said measuring light reflected by the surface of the thin sheet material. Thickness variation of the thin sheet material is thereby obtained from the measured displacement of the surface position of the thin sheet material with the optical displacement gauges.

The present invention can be applied to any type of thin sheet material irrespective of material, configuration, and dimension, as long as measurement of thickness variation thereof with high accuracy is required. Material may be both conductive and non-conductive. Also, the thin sheet material may be constructed such that characteristics or electric properties thereof vary at different locations, or may be constructed multi-layered with a plurality of different materials. Specifically, thin sheet material includes wafers for semiconductor devices made of silicone or the like, metal plates for magnetic disks, ceramic plates, resin plates, and others. The shape of the thin sheet material is mostly disk-like or circular shape particularly in the case of wafers, but it is not limited to the circular shape.

The surface of the thin sheet material should preferably have superior reflectance such as a mirror plate. However, in the case of using the probe reflector of the present invention to be described later, the surface of the thin sheet material need not particularly have superior reflectance.

The apparatus for measuring thickness variation of a thin sheet material according to the present invention comprises a pair of optical displacement gauges disposed opposite each other, with the thin sheet material being arranged between the two optical displacement gauges. The thin sheet material is supported such as to be rotatable, so that measurement by the optical displacement gauges can be carried out at different locations along a circumferential direction. Furthermore, the optical displacement gauges are movable in a direction along radius of rotation of the thin sheet material, so that, combined with the rotation of the thin sheet material, measurement can be made with respect to the entire surface of the thin sheet material. It should be noted that the optical displacement gauges themselves need not be moved, but an optical system may be provided, which changes position of irradiating measuring light to the thin sheet material and position of receiving the reflected measuring light, for achieving the same function. Such scanning measurement is especially suitable for quality control in a production line.

By summing up the amounts of displacement of the surface positions of both faces of the thin sheet material that are measured respectively by the two optical displacement gauges, thickness variation of the thin sheet material can be obtained. An electronic circuit will suffice for performing such calculation for obtaining thickness variation of the thin sheet material. Alternatively, an operation/processing device such as a microcomputer may be used, in which predetermined operating and data processing procedures are programmed in advance.

For the optical displacement gauge, any type of gauge or measuring device can be used, that has a function of measuring the distance or change in the distance to an object being measured by irradiating measuring light to the object and by receiving the reflected measuring light, in order to determine displacement of the surface position of the object.

Specifically, various techniques that utilize the theory of triangulation, optical interferometry, or holography, are known. For the measuring light, the method of using a single wavelength light and the method of using a plurality of wavelengths light can both be applied. Also, an optical three-dimensional shape measuring apparatus, or a shape recognizing sensor can be utilized.

According to the present invention, the optical displacement gauge comprises a light output section for generating light consisting of reference light and measuring light; a light separation and gathering section for separating said light output from the light output section into the measuring light and the reference light, said measuring light being irradiated onto the surface of the thin sheet material, and for gathering the measuring light reflected by the surface of the thin sheet material and the reference light together; and a light receiving and calculation section for receiving the measuring light and the reference light gathered in the light separation and gathering section, and for calculating displacement in the surface position of the thin sheet material.

While the optical path of the measuring light varies depending on the distance from the optical displacement gauge to the surface of the thin sheet material, the optical path of the reference light remains constant. Accordingly, by measuring the difference in optical path of the measuring light and the reference light, displacement in the surface position of the thin sheet material can be obtained. Such difference in the optical path of the measuring light and the reference light can be readily detected in the light receiving and calculation section by making the wavelength of the measuring light and the reference light output from the light output section different.

In the light output section, the reference light and measuring light are generated by a laser oscillator or the like, with which the wavelengths of these light beams are precisely controlled. The light separation and gathering section comprises an optical system including a polarizing beam splitter, a $\lambda/4$-wave plate, and mirrors. The light receiving and calculation section comprises photoelectric converters, electric circuits for processing electric signals, operation circuits, and others.

Further, a converging lens is disposed between the light output section and the light separation and gathering section for converging the light output from the light output section into the light separation and gathering section. The converging lens focuses the measuring light irradiated onto the thin sheet material so that the measuring light is directed only in a limited area on the thin sheet material, thereby enhancing measurement precision. This converging lens is disposed not between the light separation and gathering section and the thin sheet material, but between the light output section and the light separation and gathering section according to the present invention, whereby the optical path of the measuring light from the light separation and gathering section to the thin sheet material is shortened, and adverse effects of scattering caused by aerosol present between the optical displacement gauge and the thin sheet material can be reduced.

Further, a converging optical system is disposed between the light separation and gathering section and the light receiving and calculation section for converging the light output from the light separation and gathering section into the light receiving and calculation section. The converging optical system comprises various optical members such as lenses and mirrors. This converging optical system causes the composite light consisting of measuring light and reference light to be irradiated precisely onto a receiving surface in the light receiving and calculation section, thereby enhancing measurement precision. The measuring light reflected on the surface of the thin sheet material is normally inclined or deviated with respect to the optical passage into the light receiving and calculation section because of an inclination on the surface of the thin sheet material. The provision of the converging optical system ensures that the reflected measuring light is precisely irradiated onto the light receiving surface in the light receiving and calculation section even when the measuring light is inclined or deviated after being reflected by the surface of the thin sheet material.

A probe reflector used in the optical displacement gauge according to the present invention comprises: a base end fixedly mounted to a body of the optical displacement gauge; a free end including a probe that is brought in contact with the surface to be measured and a reflection surface that reflects the measuring light irradiated thereonto; and a support arm for connecting said free end to the base end, comprising a pair of plate pieces that can be elastically deformed, said plate pieces being spaced from each other in a direction orthogonal to the surface to be measured and arranged parallel to each other.

Such probe reflector can be applied broadly to an optical measuring device for obtaining position information of a surface to be measured by receiving measuring light reflected by the surface being measured.

While novel features of the invention are set forth in the preceding, the invention, both as to organization and content, can be further understood and appreciated, along with other objects and features thereof, from the following detailed description and examples when taken in conjunction with the attached drawings.

DESCRIPTION OF PREFERRED EMBODIMENTS

Figure 1:
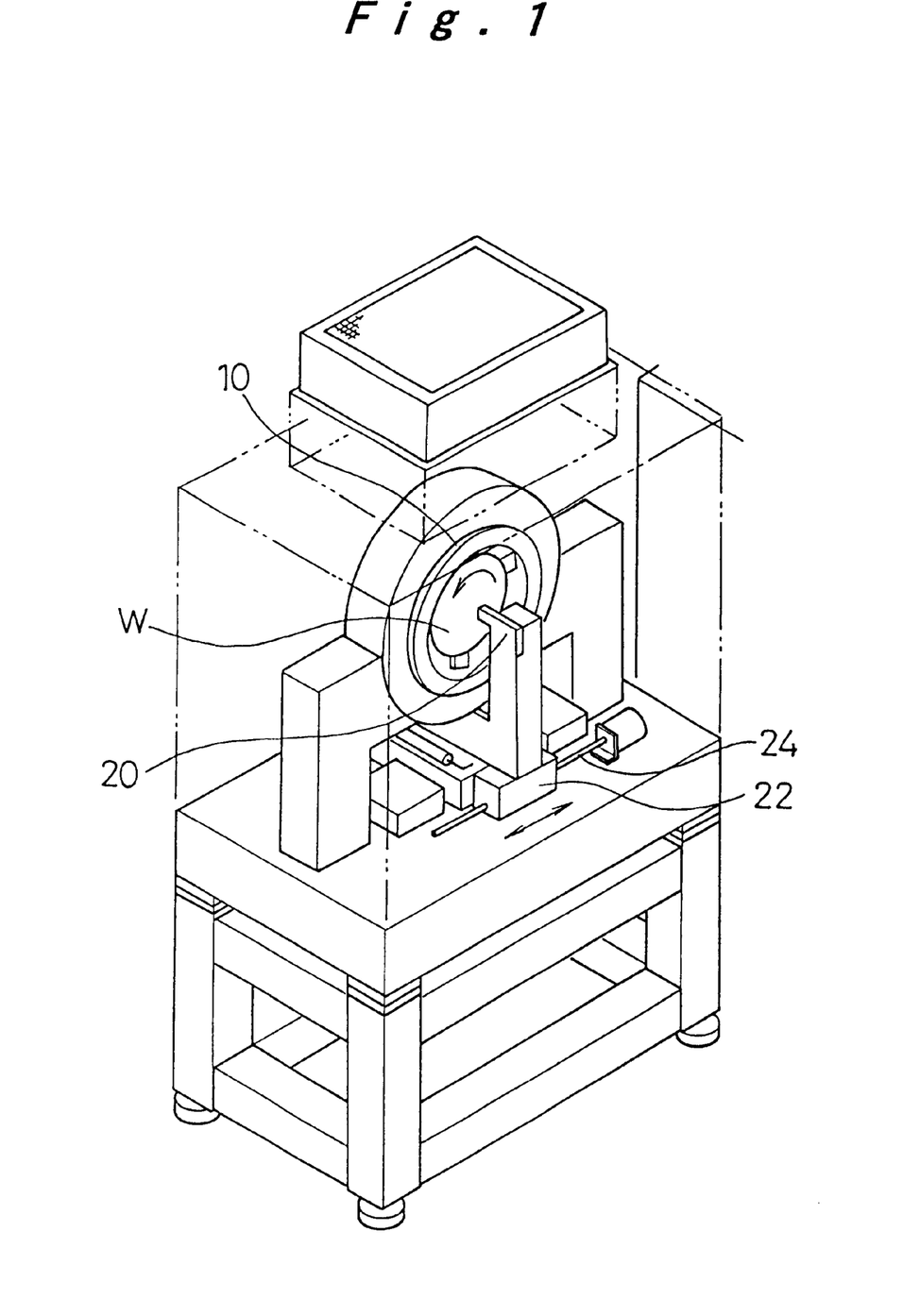
FIG. 1 is a perspective view showing the entire measuring apparatus according to one embodiment of the present invention.

FIG. 1 shows the entire construction of the thickness variation measuring apparatus for semiconductor wafers according to one embodiment of the present invention. A wafer w is held vertically upright by a circular hollow spindle 10, and is rotated within the vertical plane by rotation of the hollow spindle 10. To one side opposite both faces of the wafer w, a pair of optical displacement gauges 20 are respectively disposed. Although only the one on the side of the front surface is shown in the drawing, the optical displacement gauge 20 is also arranged on the backside opposite the one on the front surface. The pair of optical displacement gauges 20 are mounted such as to be movable in a direction parallel to the surface of the wafer w, so that the measurement position of the optical displacement gauges 20 moves leftwards and rightwards along the radius of the wafer w. Specifically, the optical displacement gauges 20 are mounted on a table 24 that is linearly moved on a ball screw 24 by rotation thereof.

Figure 2:
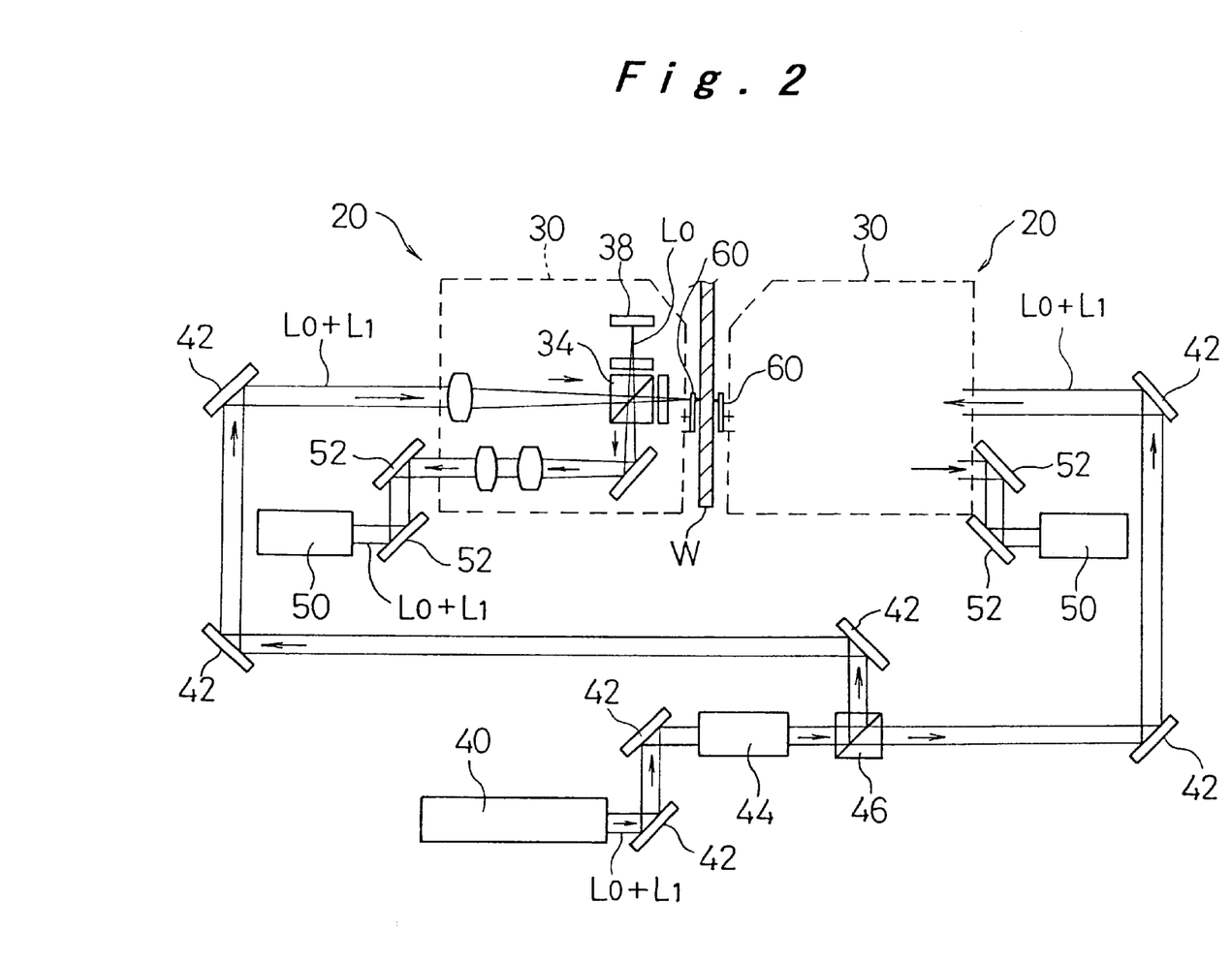
FIG. 2 is a diagram showing the entire construction of the measuring mechanism.

The optical displacement gauges 20 on both faces of the wafer w respectively comprise an optical system 30 and a light receiving section 50, and is operated with light emitted from a single laser output device 40, as shown in FIG. 2.

The laser output device 40 outputs frequency-stabilizing He—Ne laser light $L_0+L_1$ comprising a reference light beam $L_0$ and a measurement light beam $L_1$. The light $L_0+L_1$ output from the laser output device 40, after passing through a plurality of mirrors 42 and an isolator 44, is divided into two light beams by a beam splitter 46. The divided light beams $L_0+L_1$ are directed further through a plurality of mirrors 42 and into the measurement optical systems 30, 30 on both sides of the wafer w.

Figure 3:
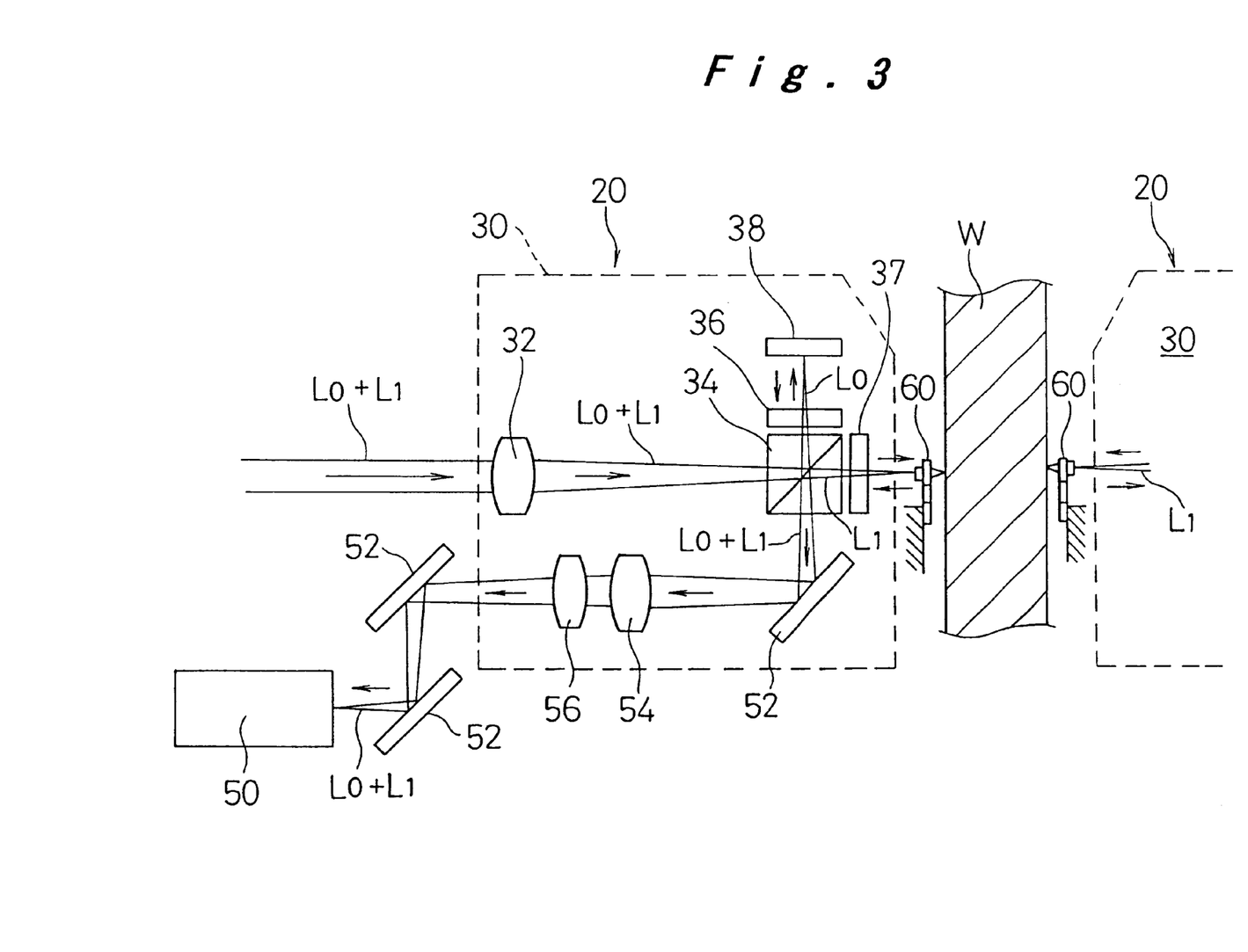
FIG. 3 is a diagram showing the construction in detail of a major part of the measuring mechanism of FIG. 2.

In the measurement optical system 30, as shown in detail in FIG. 3, the output light $L_0+L_1$ is focused by a converging lens 32 and is directed to a polarizing beam splitter 34. The converging lens 32 focuses the output light $L_0+L_1$ thereby converging and irradiating the measuring light $L_1$ precisely to a position on the wafer surface. In this embodiment, however, the light is not directly focused on the wafer surface, but on the reflecting surface of a probe reflector 60. The polarizing beam splitter 34 separates the output light $L_0+L_1$ such that the measuring light $L_1$ goes straight therethrough, while the reference light $L_0$ is reflected at right angles. Such separation of light is caused by the difference in polarizing direction of the reference light $L_0$ and the measuring light $L_1$ output from the laser output device 40.

After passing through a $\lambda/4$-wave plate 37, the measuring light $L_1$ proceeds toward the surface of the wafer w. The probe reflector 60 is contacted on the wafer surface, so that the measuring light $L_1$ is reflected by the probe reflector 60 back to the polarizing beam splitter 34. Meanwhile, the reference light $L_0$, after passing through a $\lambda/4$-wave plate 36, is reflected by a reference mirror 38 and is also returned to the polarizing beam splitter 34. The distance from the polarizing beam splitter 34 to the reference mirror 38 is set identical to the distance from the polarizing beam splitter 34 to the probe reflector 60.

The reference light $L_0$ returned to the polarizing beam splitter 34 goes straight therethrough this time, while the measuring light $L_1$ is reflected by the polarizing beam splitter 34 at right angles so that it is directed in the same direction as that of the reference light $L_0$. As a result, the polarizing beam splitter 34 outputs a composite light beam $L_0+L_1$. However, since the optical path of the measuring light $L_1$ is varied by the distance from the polarizing beam splitter 34 to the probe reflector 60, while that of the reference light $L_0$ is not varied, there is an optical path difference or phase difference between the two light beams.

The composite light $L_0+L_1$ output from the polarizing beam splitter 34 is then passed through a plurality of mirrors 52, a collimator lens 54, and a focusing lens 56, and input into a light receiving section 50. The collimator lens 54 aligns the light $L_0+L_1$ parallel and the focusing lens 56 focuses the light $L_0+L_1$ to a light receiving surface of the light receiving section 50 precisely by correcting inclination or deviation of light caused by being reflected by the wafer surface. The light receiving section 50 converts optical signals into electric signals, analyzes the wavelengths and phases of the reference light $L_0$ and measuring light $L_1$ in an electrical manner, and processes the obtained data, whereby numerical information representing the position of the surface of the wafer w and/or change in such position of the wafer surface is achieved. By utilizing interference between the reference light $L_0$ and measuring light $L_1$, the difference in optical path as mentioned above or the difference in phase in these light beams can be enlarged or made distinct by interference fringes, and thereby the displacement information of the wafer surface can be readily obtained in the form of electric signals by a photoelectric converter.

Variation or displacement in the position of the surface of a wafer w can be detected by carrying out the measurement described above at different locations along the surface of the wafer w. The surface displacement of the wafer w is measured on both sides of the wafer by the pair of optical displacement gauges 20, 20. The sum of the surface displacement on both sides of the wafer w represents variation in thickness of the wafer w. In measurement of thickness variation, it is not particularly necessary to measure the thickness itself of the wafer w, but rather the difference in thickness in the surface direction of wafer need to be measured. However, if the distance between the left and right optical displacement gauges 20, 20 is known, it is also possible to determine the thickness itself of the wafer w from the position information of the wafer surface with respect to both of the two optical displacement gauges 20, 20.

Figure 4:
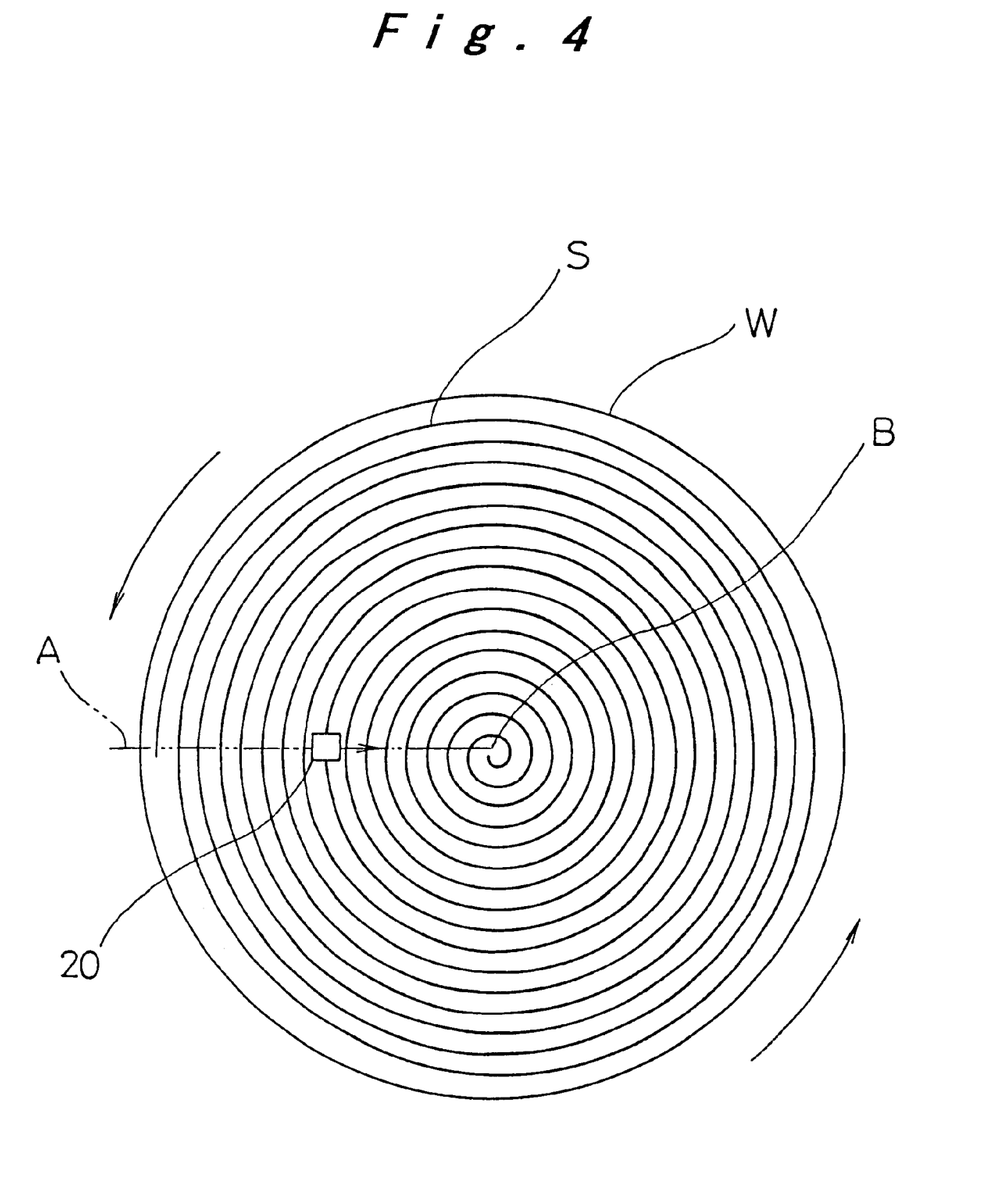
FIG. 4 is a model view given in explanation of a wafer measuring operation.

The method of measuring the surface displacement of the entire surface of the wafer w by the optical displacement gauge 20 is described with reference to FIG. 4.

As noted above, the wafer w is rotated in one direction on a vertical plane. For measuring surface displacement of wafer, the optical displacement gauge 20 is moved with respect to the wafer w in a radial direction from a point A at a peripheral edge to a point b in the center of the wafer w. Thereby, the position of the optical displacement gauge 20 relative to the wafer w is moved along a spiral track denoted at S. Measurement by the optical displacement gauge 20 is carried out at appropriate intervals on this track S, whereby displacement of the entire surface of wafer w can be efficiently measured. Moreover, since the optical displacement gauge 20 is moved linearly and horizontally along the radius A to B of the wafer w, the mechanism for operating the optical displacement gauge 20 can be simply constructed.

Since the wafer w held on the hollow spindle 10 is rotated by a motor, it takes time until the rotation speed reaches a predetermined value because of moment of inertia of the wafer w and rotating members of the hollow spindle 10. The rotation speed gradually increases from zero and reaches the predetermined speed after a certain period of time. When the measurement ends and rotation of wafer is stopped, as the rotation speed gradually decreases to zero, it also takes some time until the wafer comes to a halt. Similarly, the speed of linear movement of the optical displacement gauge 20 gradually increases from zero in the beginning and gradually decreases at the end down to zero.

Accordingly, if the measurement were made only during the rotation speed of the wafer is constant, the entire measurement tact would be lengthened by the time required for the rotation speed to reach a predetermined speed in the beginning of measurement and the time required from the end of measurement until the wafer comes to a complete stop. Specifically, the measurement tact time is unnecessarily lengthened by the time from the moment when the wafer starts to rotate until its rotation speed reaches a constant speed, during which measurement cannot be carried out.

The method according to the present invention hereinafter described resolves such problem of unnecessary loss of time in measurement tact, and thereby, measurement can be carried out much more efficiently.

Figure 5:
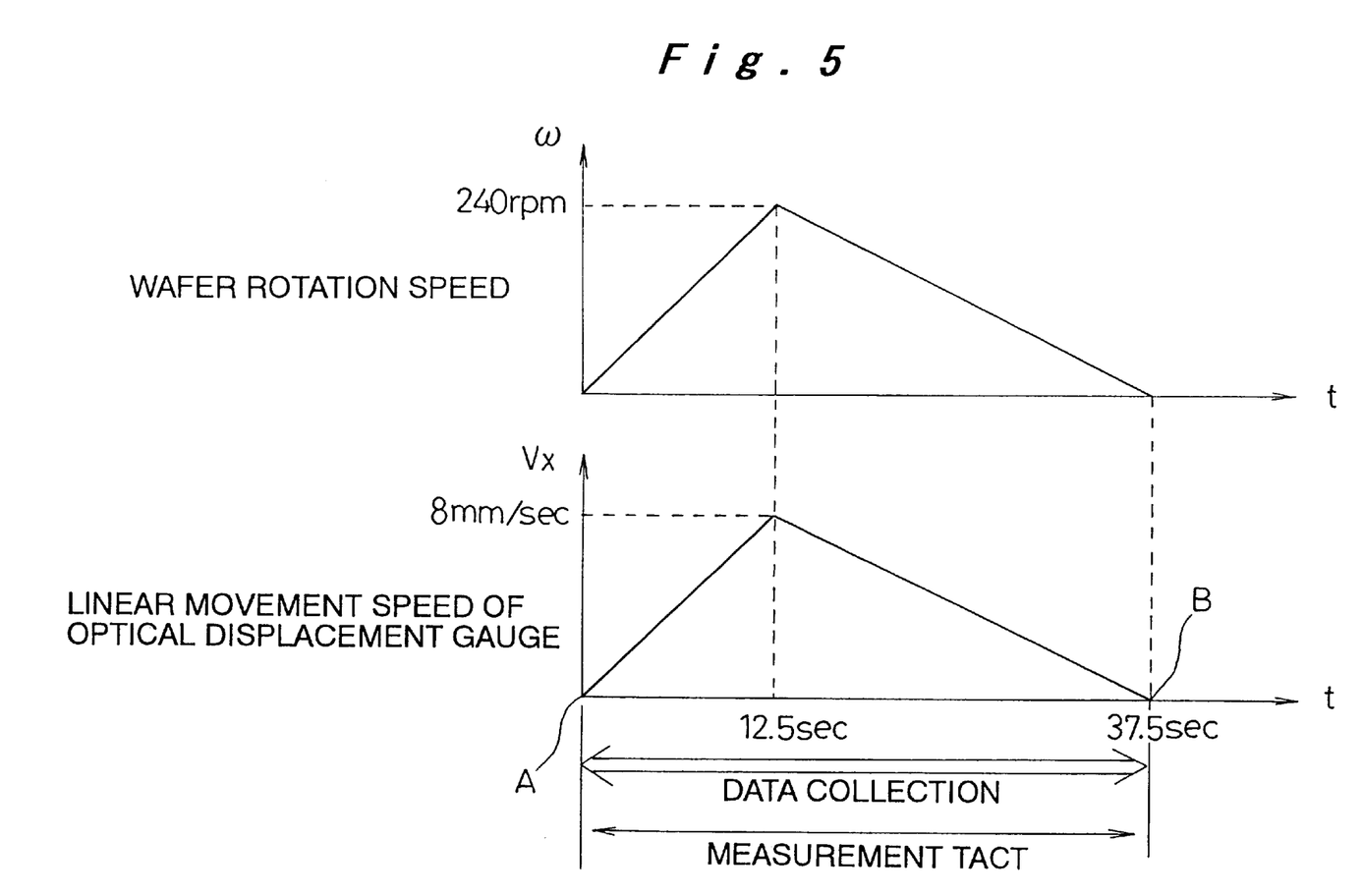
FIG. 5 is a time chart showing the actions of the wafer and optical displacement gauge.

FIG. 5 is a time chart showing change of wafer rotation speed (angle speed) ω and change of linear movement speed Vx of the optical displacement gauge 20 in one measurement tact according to the measurement method of the present invention.

As shown in FIG. 5, the optical displacement gauge 20 is started to move simultaneously with the start of wafer rotation. At the same time, measurement by the optical displacement gauge 20 or data collection is started. The rotation speed of wafer w and the speed of the optical displacement gauge 20 are both increased gradually. As noted above, the optical displacement gauge 20 starts from the point A shown in FIG. 4 at the perimeter of the wafer w.

The rotation speed of the wafer w, and the speed and/or position of the optical displacement gauge 20, are respectively detected by means of a rotary encoder and/or position sensors, results of which are processed by a calculation means such as a micro computer. Control of driving motors and/or actuators of the wafer and the optical displacement gauge 20 is effected based on such detection results, whereby the movement of the wafer w and of the optical displacement gauge 20 can be synchronized. Thus the optical displacement gauge 20 is moved relative to the wafer w along the spiral track S shown in FIG. 4. Measurements of displacement of the wafer are carried out at predetermined locations set on the track S.

The speed Vx of the optical displacement gauge 20 is increased from the point A at the perimeter to a point approximately in the middle between the radius A–B, and as soon as the speed Vx reaches a predetermined speed, for example, 8 mm/sec as shown in FIG. 5, the speed is decreased so that the optical displacement gauge 20 will come to a halt at the center point B. According to this method, a period during which the optical displacement gauge 20 is moved at a constant speed for the measuring purpose is not particularly necessary. Similarly, the rotation speed ω of the wafer is increased until it reaches a maximum speed, for example, 240 rpm as shown in FIG. 5, which is at the same time as the peak point of the speed Vx of the optical displacement gauge 20, and from the moment it reaches the maximum speed, the rotation speed of wafer is decreased until it comes to a complete stop at the same time as the optical displacement gauge comes to a halt.

According to this method, the measurement tact time is remarkably reduced as compared to a method wherein measurement is started only when the rotation speed of wafer becomes constant, and wherein the rotation speed gradually decreases until it stops completely after the end of measurement.

In this embodiment, the measuring light $L_1$ is not reflected directly by the surface of the wafer w but by the probe reflector 60, whereby displacement of the surface position of the wafer w is measured indirectly. The probe reflector 60 according to the present invention will be described in detail next.

Figure 6:
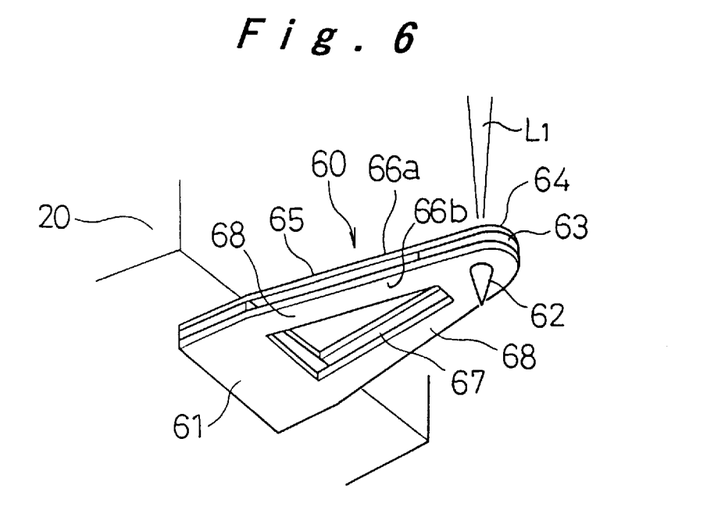
FIG. 6 is a perspective view from below of a probe reflector.
Figure 7:
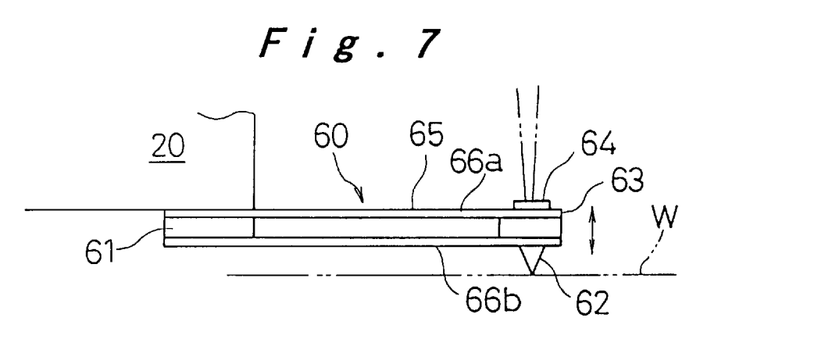
FIG. 7 is a side elevation view of same.
Figure 8:
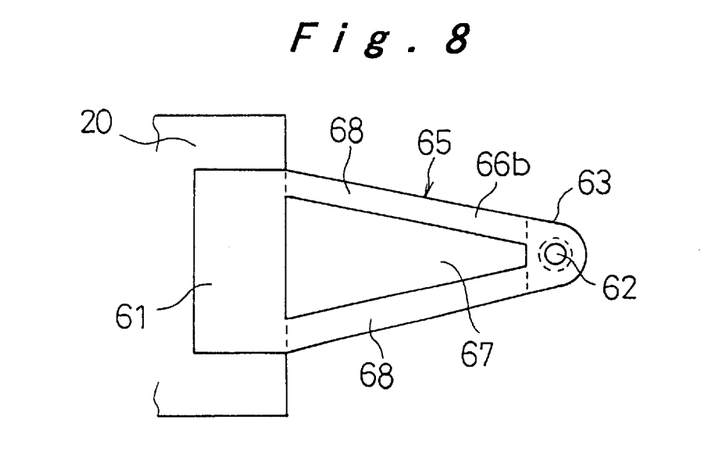
FIG. 8 is a bottom view of same.

As shown in FIG. 6 to FIG. 8, the probe reflector 60 comprises a base end 61 that is mounted to the distal end of the optical displacement gauge 20 on the side of the wafer w, a free end 63 including a probe 62 and a reflection surface 64, and a support arm 65 comprising parallel plates and connecting the free end 63 to the base end 61.

The probe 62 is made of diamond and has a tip of about 10 μm, which is brought in substantially point contact with the surface of the wafer w. The probe 62 may be made in any of conical, pyramid, pin-like, or any other pointed shape. The reflection surface 64 is constructed of a mirror plate of glass or metal and reflects the measuring light $L_1$ with high efficiency. The reflection surface 64 is positioned right opposite to the direction from which the measuring light $L_1$ is irradiated, and the probe 62 is disposed such that its tip is positioned on an extension line of the irradiated measuring light $L_1$.

The support arm 65 comprises upper and lower plate pieces 66a, 66b made of a material which is capable of deforming elastically such as a leaf spring, these plate pieces 66a, 66b being spaced and arranged parallel to each other as shown in FIG. 7. These two parallel plate pieces 66a, 66b fixed by the base end 61 and the free end 63 constitute a link mechanism of parallelogram, a so-called parallel link mechanism. The plate pieces 66a, 66b in this embodiment are preferably, but not necessarily, made of leaf spring material, for example, of about 10 μm thickness and of about 10 mm length.

The planar outline of the plate pieces 66a, 66b is configured to be trapezoidal as shown in FIG. 8 with the base end 61 side being wider and the free end 63 side being narrower.

A through hole 67 of trapezoidal shape that is smaller than the trapezoidal plate piece outline is formed in the middle of the plate pieces 66a, 66b. Remaining portions of the plate pieces 66a, 66b constitute a pair of arms 68, 68 spaced from each other with a larger distance at the base end 61 side and with a smaller distance at the free end 63 side. With this construction, the support at the free end is made stable, and deformation property in the thickness direction is enhanced, while deformation in other directions is prevented.

When there is a displacement in the surface position of the wafer w in an upwards direction with respect to the optical displacement gauge 20, the probe 62 in the probe reflector 60 is pushed upwards by the wafer surface, and the support arm 65 is in turn pushed upwards. The upper and lower plate pieces 66a, 66b constituting the parallel link mechanism are deformed upwards independently of each other in a state that they are maintained parallel to each other. Accordingly, the free end 63 moves upward and downward with respect to the base end 61 substantially parallel to the base end 61. The reflection surface 64 provided to the free end 63 moves same as the free end 63, thus it moves upward and downward with respect to the measuring light $L_1$ as being right opposite thereto. As a result, the reflection surface 64 is capable of reflecting the measuring light $L_1$ to exactly the same direction as the direction from which the measuring light $L_1$ is irradiated, irrespective of displacement in the surface position of the wafer w.

There may be a displacement in the surface position of the wafer w not only in the upward direction but also in a downward direction. This can be coped with by carrying out the measurement in a state that the probe reflector 60 is lightly contacted to the surface of the wafer w, with the support arm 65 being elastically deformed. Detection of surface displacement both in the upward and downward directions is thereby possible. Specifically, but not necessarily, the support arm 65 may be elastically deformed by approximately 100 µm at the initial stage.

As noted above, any inclination or deviation in the direction of reflected measuring light $L_1$ would make it difficult to receive the light precisely at the light receiving section 50. With the probe reflector 60 of the present invention, there is hardly any inclination or deviation of reflected light owing to the support arm 65 that constitutes a parallel link mechanism as described above. Furthermore, since the construction of the support arm 65 is such that the left and right arms 68, 68 are arranged with a large distance from each other at the base end side, it is effectively prevented that the free end 63 tilts left- or rightwards or that the support arm 65 is twisted. Accordingly, the direction of reflected measuring light $L_1$ can be maintained in a favorable condition.

The above described function of preventing inclination or deviation of reflected light is common to the focusing lens 56. Thus the intended function can be achieved without the focusing lens 56, as long as the probe reflector 60 is provided. However, the provision of the focusing lens 56 in addition to the probe reflector 60 ensures even superior performance of such function.

In case a thin sheet material to be measured has poor surface reflectance, measurement becomes difficult or measurement results lack precision because of insufficiency in the reflected measuring light. Also, if there is a variation in reflectance on the surface of the thin sheet material depending on location, the measurement results may be adversely affected. However, with the use of the probe reflector 60, such problems as described above caused by reflecting properties of the surface of the thin sheet material can be resolved, owing to the reflection surface 64 which exhibits superior reflectance with high efficiency. Accordingly, even when the surface of the thin sheet material consists of a material with low reflectance or of a structure in which reflectance differs depending on location, the reflection surface 64 is capable of reflecting the measuring light $L_1$ with high efficiency and stability, whereby accurate and stable measurement of displacement in the thin sheet surface becomes possible.

Furthermore, thanks to the support arm comprising parallel plate pieces as described above, the free end of the support arm can freely follow irregularities or changes in the configuration of the surface being measured, with the support arm being elastically deformed for maintaining the attitude or angle of the reflection surface with respect to the measuring light constant. As a result, the precision of optical measurement can be remarkably enhanced.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. An apparatus for measuring thickness variation of a thin sheet material, comprising:
    a support unit for rotatably supporting a thin sheet material;
    a pair of optical displacement gauges for irradiating measuring light onto a surface of the thin sheet material, and for receiving said measuring light reflected by the surface of the thin sheet material, by which displacement of surface position of the thin sheet material is measured;
    a calculation unit for obtaining thickness variation of the thin sheet material from the measured displacement of the surface position of the thin sheet material;
    an actuator for moving said optical displacement gauges in a direction along a radius of rotation of the thin sheet material; and
    each optical displacement gauge of said pair of optical displacement gauges including:
        a light output section for generating light comprising reference light and measuring light;
        a light separation and gathering section for separating said light output from the light output section into the measuring light and the reference light, said measuring light being irradiated onto the surface of the thin sheet material, and for gathering the measuring light reflected by the surface of the thin sheet material and the reference light together;
        a light receiving and calculation section for receiving the measuring light and the reference light gathered in the light separation and gathering section, and for calculating displacement of the surface position of the thin sheet material; and
        a converging lens disposed between said light output section and said light separation and gathering section for converging the light output from the light output section and feeding a converged beam into the light separation and gathering section.

2. The apparatus for measuring thickness variation of a thin sheet material according to claim 1 wherein said optical displacement gauge comprises:
    a light output section for generating light comprising reference light and measuring light;
    a light separation and gathering section for separating said light output from the light output section into the measuring light and the reference light, said measuring light being irradiated onto the surface of the thin sheet material, and for gathering the measuring light reflected by the surface of the thin sheet material and the reference light together;
    a light receiving and calculation section for receiving the measuring light and the reference light gathered in the light separation and gathering section, and for calculating displacement of the surface position of the thin sheet material; and
    a converging optical system disposed between said light separation and gathering section and said light receiving and calculation section for converging the light output from the light separation and gathering section into the light receiving and calculation section.

3. The apparatus for measuring thickness variation of a thin sheet material according to claim 1 wherein said pair of optical displacement gauges are disposed opposite both faces of the thin sheet material on one side thereof.

4. An apparatus for measuring thickness variation of a thin sheet material, comprising:
a support unit for rotatably supporting a thin sheet material;
a pair of optical displacement gauges for irradiating measuring light onto a reflecting surface, and for receiving said measuring light reflected by the reflecting surface, by which displacement of surface position of the thin sheet material is measured;
a calculation unit for obtaining thickness variation of the thin sheet material from the measured displacement of the surface position of the thin sheet material; and
an actuator for moving said optical displacement gauges in a direction along a radius of rotation of the thin sheet material, wherein said optical displacement gauge comprises a probe reflector that is moved along the surface of the thin sheet material in contact therewith such as to follow the displacement in the surface position of the thin sheet material, and includes the reflecting surface disposed on the probe reflector for tracking surface variations of the thin sheet material, thereby permitting measurements of variations of the thin sheet material.

5. An apparatus for measuring thickness variation of a thin sheet material, comprising:
a support unit for rotatably supporting a thin sheet material;
a pair of optical displacement gauges for irradiating measuring light onto a reflecting surface, and for receiving said measuring light reflected by the reflecting surface, by which displacement of surface position of the thin sheet material is measured;
a calculation unit for obtaining thickness variation of the thin sheet material from the measured displacement of the surface position of the thin sheet material;
an actuator for moving said optical displacement gauges in a direction along a radius of rotation of the thin sheet material, wherein said optical displacement gauge includes a probe reflector, which comprises a base end fixedly mounted to a body of the optical displacement gauge, a free end including a probe that is brought in contact with the surface to be measured and the reflecting surface disposed on the probe reflector for tracking surface variations of the thin sheet material, thereby permitting measurements of variations of the thin sheet material, and a support arm for connecting said free end to the base end, comprising a pair of plate pieces that can be elastically deformed, said plate pieces being spaced from each other in a direction orthogonal to the surface to be measured and arranged parallel to each other.

6. The probe reflector according to claim 5 wherein said plate pieces are formed in trapezoidal shape with a greater width at the base end side and with a smaller width at the free end side.

7. The probe reflector according to claim 5 wherein said plate pieces comprise a pair of arms spaced apart from each other in a direction parallel to the surface to be measured, with the distance between the pair of arms being wider at the base end side than the distance therebetween at the free end side.

8. An apparatus for measuring thickness variation of a thin sheet material, comprising:
a support unit for rotatably supporting a thin sheet material;
a pair of optical displacement gauges for irradiating measuring light onto a reflecting surface, and for receiving said measuring light reflected by the reflecting surface, by which displacement of surface position of the thin sheet material is measured;
a calculation unit for obtaining thickness variation of the thin sheet material from the measured displacement of the surface position of the thin sheet material;
an actuator for moving said optical displacement gauges in a direction along a radius of rotation of the thin sheet material;
each optical displacement gauge of said pair of optical displacement gauges including:
a light output section for generating light comprising reference light and measuring light;
a light separation and gathering section for separating said light output from the light output section into the measuring light and the reference light, said measuring light being irradiated onto the reflecting surface, and for gathering the measuring light reflected by the reflecting surface and the reference light together;
a light receiving and calculation section for receiving the measuring light and the reference light gathered in the light separation and gathering section, and for calculating displacement of the surface position of the thin sheet material; and
a converging lens disposed between said light output section and said light separation and gathering section for converging the light output from the light output section and feeding a converged beam into the light separation and gathering section; and
a probe reflector that is moved along the surface of the thin sheet material in contact therewith such as to follow the displacement in the surface position of the thin sheet material and including the reflecting surface disposed on the probe reflector for tracking variations of the thin sheet material, thereby permitting measurements of variations of the thin sheet material.

9. An apparatus for measuring thickness variation of a thin sheet material, comprising:
a support unit for rotatably supporting a thin sheet material;
a pair of optical displacement gauges for irradiating measuring light onto a reflecting surface, and for receiving said measuring light reflected by the reflecting surface, by which displacement of surface position of the thin sheet material is measured;
a calculation unit for obtaining thickness variation of the thin sheet material from the measured displacement of the surface position of the thin sheet material;
an actuator for moving said optical displacement gauges in a direction along a radius of rotation of the thin sheet material;
each optical displacement gauge of said pair of optical displacement gauges including:
a light output section for generating light comprising reference light and measuring light;
a light separation and gathering section for separating said light output from the light output section into the measuring light and the reference light, said measuring light being irradiated onto the reflecting surface, and for gathering the measuring light reflected by the reflecting surface and the reference light together;
a light receiving and calculation section for receiving the measuring light and the reference light gathered in the light separation and gathering section, and for calculating displacement of the surface position of the thin sheet material; and
a converging lens disposed between said light output section and said light separation and gathering section for converging the light output from the light output section and feeding a converged beam into the light separation and gathering section; and
a probe reflector, which includes a base end fixedly mounted to a body of the optical displacement gauge, a free end including a probe that is brought in contact with the surface to be measured, and the reflecting surface disposed on the probe reflector for tracking surface variations of the thin sheet material, thereby permitting measurements of variations of the thin sheet material, and a support arm for connecting said free end to the base end, including a pair of plate pieces that can be elastically deformed, said plate pieces being spaced from each other in a direction orthogonal to the surface to be measured and arranged parallel to each other.

10. The probe reflector according to claim 9 wherein said plate pieces are formed in trapezoidal shape with a greater width at the base end side and with a smaller width at the free end side.

11. The probe reflector according to claim 9 wherein said plate pieces comprise a pair of arms spaced apart from each other in a direction parallel to the surface to be measured, with the distance between the pair of arms being wider at the base end side than the distance therebetween at the free end side.

* * * * *